United States Patent [19]

Saito et al.

[11] Patent Number: 5,365,295
[45] Date of Patent: Nov. 15, 1994

[54] FILM TRANSPORTING SYSTEM FOR PHOTOGRAPHIC CAMERA

[75] Inventors: Tatsuo Saito; Haruo Onozuka, both of Ohmiya, Japan

[73] Assignee: Fuji Photo Optical Co., Ltd., Ohmiya, Japan

[21] Appl. No.: 73,171

[22] Filed: Jun. 8, 1993

[30] Foreign Application Priority Data

Jun. 9, 1992 [JP] Japan .................... 4-173737

[51] Int. Cl.$^5$ .......................... G03B 1/18; G03B 7/26; G03B 19/02; G03B 1/60
[52] U.S. Cl. ........................ 354/173.1; 354/484; 354/207; 354/218; 354/212
[58] Field of Search ............... 354/173.1, 484, 207, 354/212, 217, 218, 468

[56] References Cited

U.S. PATENT DOCUMENTS

| | | | |
|---|---|---|---|
| 4,174,888 | 11/1979 | Hunn et al. | 354/217 X |
| 4,816,862 | 3/1989 | Taniguchi et al. | 354/484 X |
| 4,864,332 | 9/1989 | Harvey | 354/173.1 X |
| 5,027,150 | 6/1991 | Inoue et al. | 354/484 |
| 5,136,314 | 8/1992 | Kazami et al. | 354/173.1 |

OTHER PUBLICATIONS

U.S. Application S. N. 08/071,706, filed Jun. 4, 1993 entitled Film Transporting System For Photographic Camera.
U.S. Application S. N. 08/071,703, filed Jun. 4, 1993, entitled Input System For Photographic Camera.
U.S. Application S. N. 08/081,526, filed Jun. 23, 1993, entitled Source Voltage Monitor For A Photographic Camera.
U.S. Application S. N. 08/089,883, filed Jul. 12, 1993, entitled Display Arrangement For Charging Condition In Strobing Circuit Of Photographic Camera With Built-In Strobe-Flash Device.

*Primary Examiner*—Michael L. Gellner
*Assistant Examiner*—Jae N. Noh
*Attorney, Agent, or Firm*—Price, Heneveld, Cooper, DeWitt & Litton

[57] ABSTRACT

A film transporting system for a photographic camera is adapted to advance a film roll loaded in the camera by one frame upon replacement of a source battery. A film transporter including an electric motor, or the like, is actuated to selectively perform film advance or film rewinding. A film travel detector detects that the film roll has been advanced by a predetermined amount and applies a signal to the film transporter. Operation of the film transporter is stopped by this signal. Upon replacement of the source battery, the film transporter advances the film roll by one frame, and thereupon the film transporter is stopped under control of the film travel detector. Accordingly, upon replacement of the source battery, the film roll is advanced by one frame in readiness for a next photograph.

6 Claims, 4 Drawing Sheets

FILM TRANSPORTING SYSTEM FOR PHOTOGRAPHIC CAMERA

BACKGROUND OF THE INVENTION

1. Technical Field

This invention relates to a film transporting system adapted to selectively advance or rewind a film roll loaded in the camera in automatic mode utilizing drive power provided by an electric motor, or the like.

2. Prior Art

Photographic cameras of various types requiring neither skill nor experience of users have become popular. With these handy cameras, upon closure of the rear cover after a film cartridge has been loaded into the camera, the built-in electric motor is actuated to transport the film roll by a sufficient amount to bring the camera in a state ready for photographing. Immediately after the first release, the motor is actuated again to advance the film roll by one frame and thereby to align the next frame with the aperture. Use of the final frame causes the motor to rewind the film roll into the cartridge.

Such cameras having automatic film advance and film rewinding typically utilize an electric motor for film transport and have a source battery loaded therein to energize the film transporter, comprising the electric motor. The source battery has a limited life and must be replaced by a fresh one if it is detected to have been consumed beyond its usable voltage level.

Sometimes the source battery is detected to have been consumed beyond its usable level with the film roll loaded in the camera and having several frames still remaining unused. With the conventional camera provided with such automatic film transporting system, either no film transport occurs or the entire film roll is forcibly rewound upon replacment of the source battery. Prior art film transporting systems have thus been accompanied with inconvenience as described hereinbelow.

With some prior art cameras, the film transporting system is not responsive to replacement of the source battery to perform any operation of film transport, such that a frame will be double exposed. The frame will be exposed once before the battery is replaced and once after the source battery is replaced, if the battery drops below the camera's operating threshold just before, or halfway through, a single frame advance. This occurs because the first photograph must be taken after replacement of the source battery and before film advance occurs.

Other prior art cameras are provided with a film transporting system responsive to replacement of the source battery to forcibly rewind the film roll. Double exposure is avoided by this method. However, the film roll is wastefully consumed, particularly when it contains many frames still remaining unused.

SUMMARY OF THE INVENTION

Accordingly, it is a principal object of the invention to provide a film transporting system adapted to minimize wasteful consumption of film and to prevent a photographing failure due to double exposure.

To achieve the object set forth above, the invention generally resides in a film transporting system for a photographic camera. The film transporting system comprises a film transporter energized from a source battery loaded in the camera to selectively advance or rewind a film roll loaded in the camera. A film travel detector is adapted to compare an amount by which the film roll has been transported by the film transporter with a preset value and, if the amount of travel corresponds to the preset value, to apply a stop signal to the film transporter. The film transporter is stopped by the stop signal. The film transporter is actuated upon replacement of the source battery, after an amount of travel corresponding to each used frame of the film roll has been adjusted to the present value.

Preferably, the amount of film travel is detected on the basis of travel pulses generated every time a film perforation passes by a predetermined location on the camera. The film travel detector applies a film stop signal to the film transporter when the number of travel pulses reaches a preset value.

The film travel detector detects whether the number of film travel pulses has reached the preset value within a predetermined period after the film roll has started to travel, or the film travel detector detects the film travel pulses within a preset period and this period is adjusted for every generation of a travel pulse.

To simplify the control system for operation of the initial film advance, single frame advance and film rewinding, there is provided a film transporter energized from the source battery loaded in the camera to selectively perform film advance or film rewinding. The initial film advance upon loading of the film roll, as well as the single frame advance after the shutter releases, are performed by the film transporter and a control system associated with the single frame advance is actuated upon replacement of the source battery.

According to the invention, a value corresponding to a travel of a single frame is set for the film travel detector upon replacement of the source battery if the camera has a film roll loaded therein. Upon replacement of the source battery, the film transporter is actuated to advance a single frame if the camera has the film roll loaded therein.

DETAILED DESCRIPTION OF THE PREFERRED EMBODIMENTS

The film transporting system of the invention will now be described in more detail with reference to the accompanying drawings.

Figure 1:
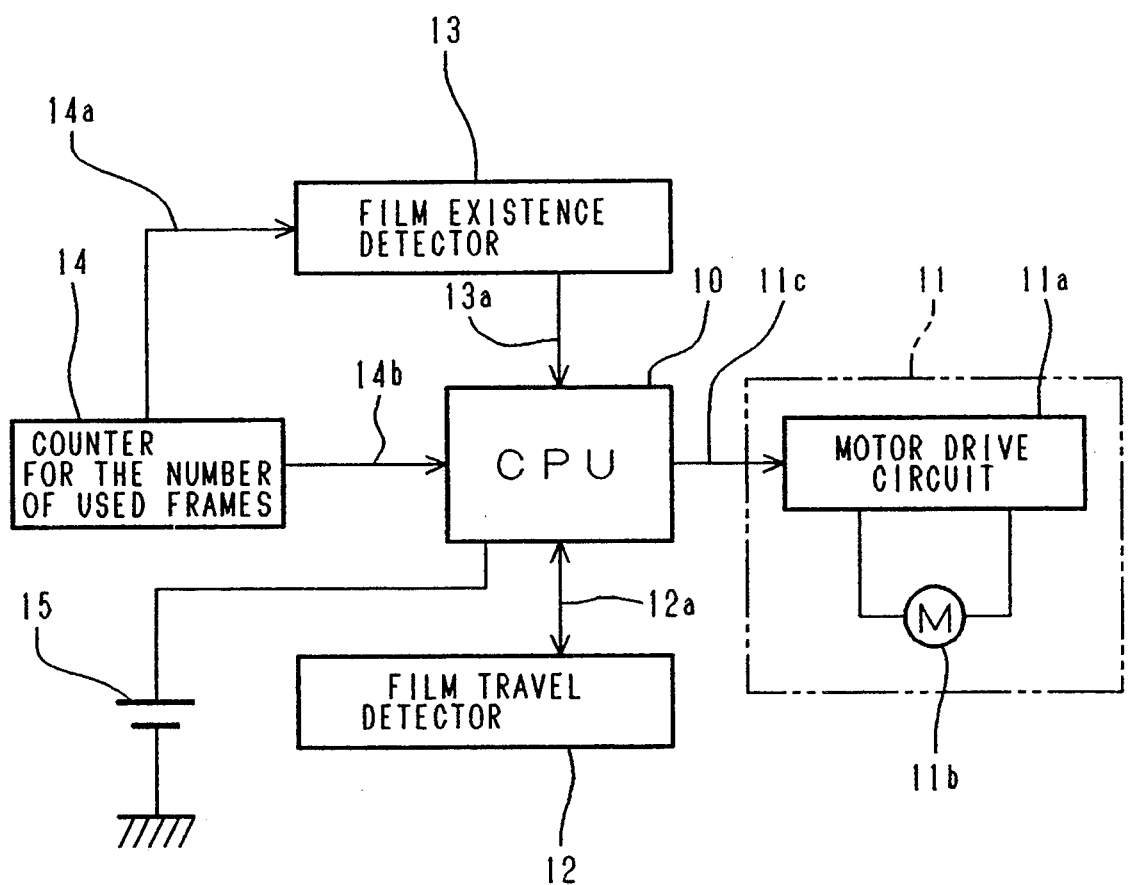
FIG. 1 is a circuit schematic in block diagram form showing the film transporting system constructed according to the invention.

FIG. 1 is a schematic block diagram of the film transporting system and, as shown, the system is constructed around a central processing unit (CPU) 10 built into the camera. A film roll loaded into the camera is advanced or rewound by the film transporter 11. The transporter includes a motor drive circuit 11a and an electric motor 11b. A motor drive signal output from CPU 10 is applied via a film transport data line 11c to the film transporter 11 and, after the film roll has traveled by an amount predetermined for the initial advance or the single frame advance, CPU 10 outputs a motor stop signal with which film transporter 11 is stopped. It is detected by film travel detector 12 whether the film roll has been transported by a predetermined amount. For example, it is detected whether an appropriate number of perforations have passed by a given location on the camera, and the :film travel detector 12 applies a film travel signal to CPU 10 via a film travel data line 12a. Upon reception of this signal, CPU 10 outputs the motor drive signal.

Film existence detector 13 uses DX codes carried on a cartridge, or the like, to detect whether the camera contains a film roll. The film existence detector applies a film existence detection signal to CPU 10 via a film existence detection data line 13a, and a count signal output from counter 14 for the number of used frames is applied to film existence detector 13 via a count data line 14a. Film existence detector 13 is adapted to detect whether the camera has a film roll loaded therein only when the count signal "0" is output from counter 14 for the number of used frames. Counter 14 applies the count signal to CPU 10 via a used frame number data line 14b. Data, such as the number of used frames corresponding to the count signal applied from CPU 10, are displayed on a liquid crystal display, or the like, provided externally of the camera so that the user may visually recognize these data.

CPU 10 is supplied with electric power from a source battery 15.

Figure 2:
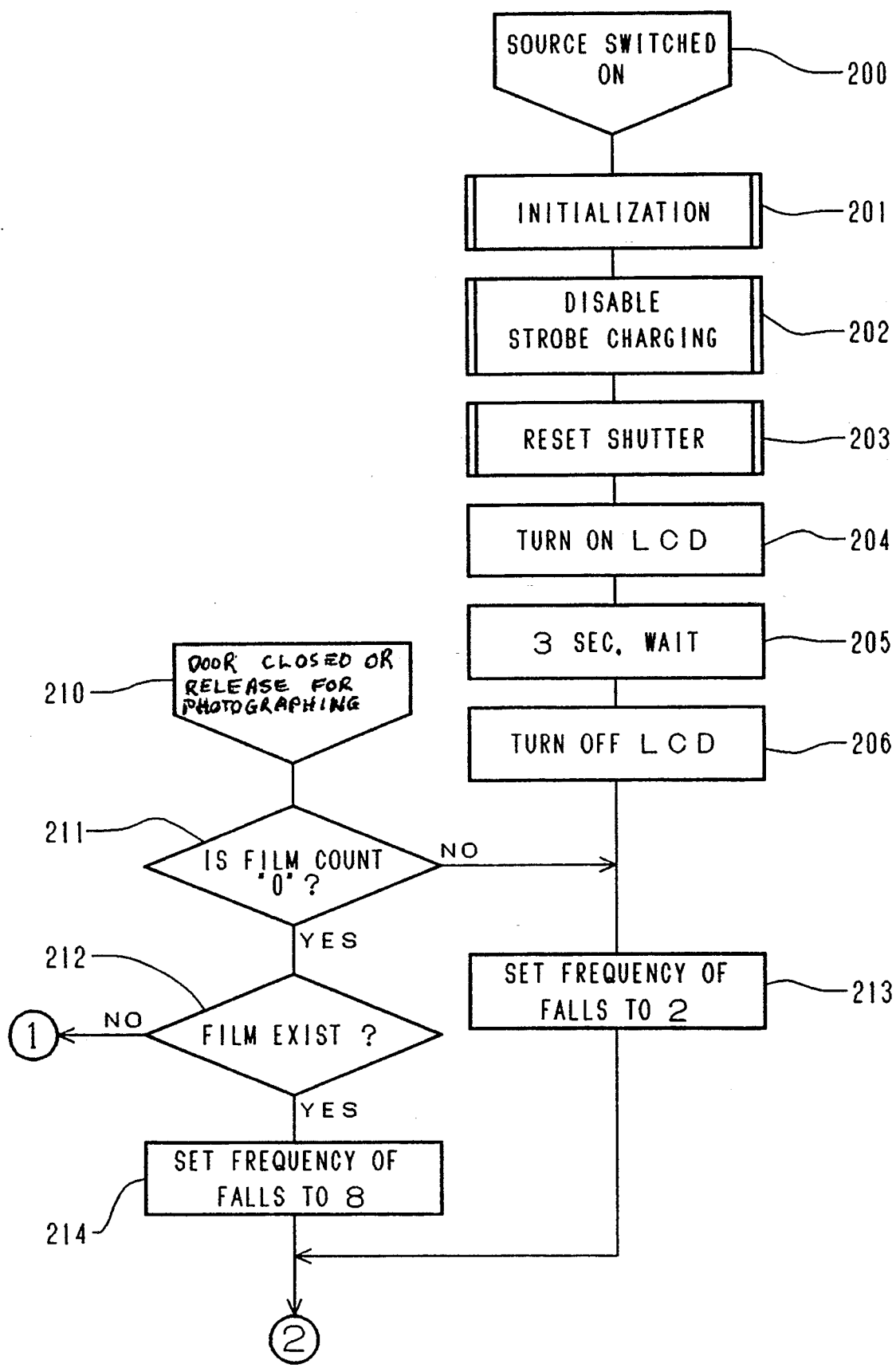
FIG. 2 is a flow chart illustrating a routine of film transporting for the system according to FIG. 1.
Figure 3:
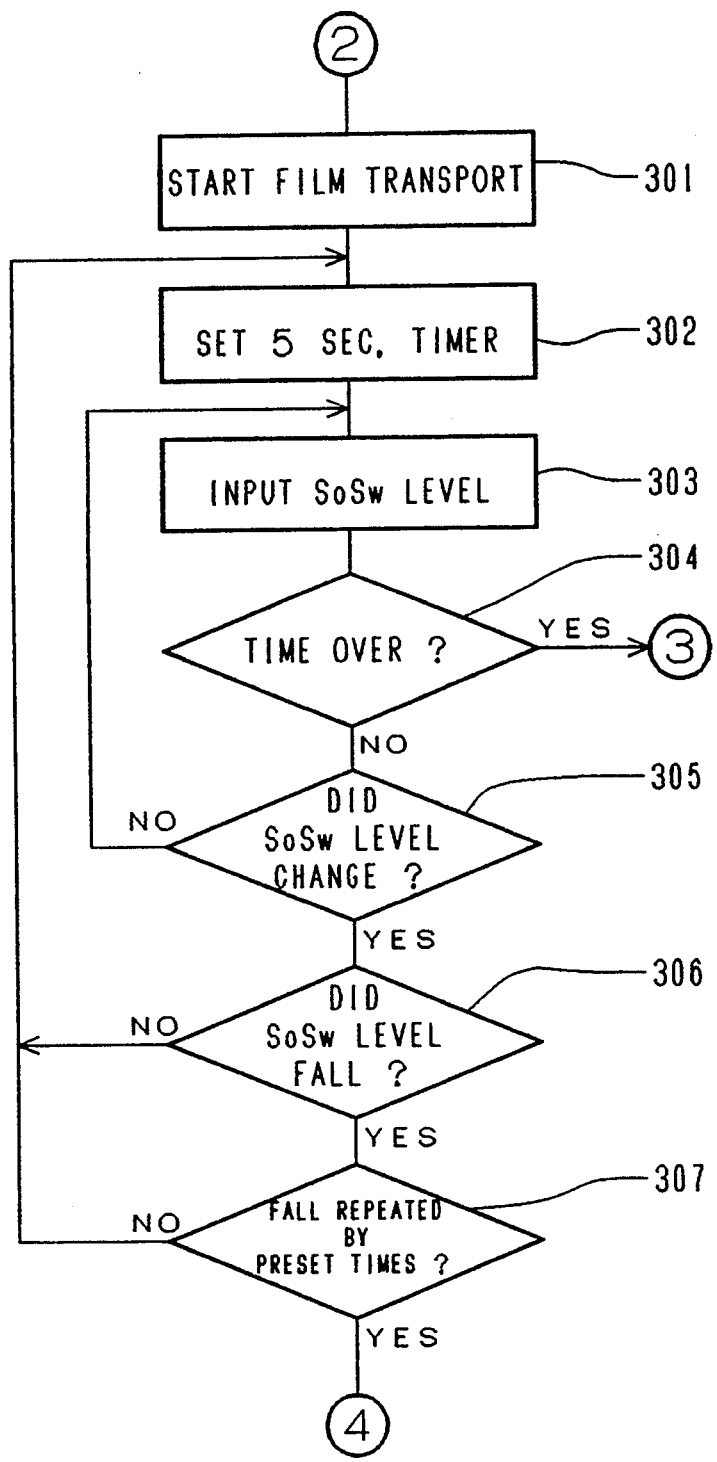
FIG. 3 also is a flow chart illustrating a routine of film transporting for the system according to FIG. 1.

Operation of the film transporting system constructed according to the invention, as has been described above, will now be described in reference with the flow charts, illustrated in FIGS. 2–4.

When a source battery is loaded into the camera and thereby switched on (step 200), an initialization is run (step 201). This initialization includes resetting the number of used film frames stored in CPU 10 to "0" and reading ISO sensitivity of the loaded film based on DX codes carried thereon. Then the routine proceeds to step 202 to disable strobe charging. Specifically, strobe charging is disabled until an initial operation associated with replacement of the source battery is completed, because strobe charging will cause a source voltage required for initial operation to drop. In step 203, a camera shutter is reset so as to obtain the optimal exposure depending on the ISO sensitivity of the loaded film that was read during the step of initialization.

The routine proceeds to step 204 to turn on the liquid crystal display (LCD) entirely and after standing by for three seconds (step 205), proceeds to step 106 to turn off the LCD entirely. Then, the routine proceeds to step 213.

In step 213, processing relevant to the single frame advance is run, whether it occurs upon replacement of the source battery or upon shutter release. Accordingly, the subsequent step will be described in connection with various steps associated with film transport.

Upon closure of the rear cover after a film roll has been loaded into the camera, or upon completion of a release for photographing, the routine proceeds from step 210 to step 211 to determine, based on the count signal applied from counter 14, whether the frame count is "0". It should be understood that step 211 is not run during replacement of the source battery. If the frame count has been determined to be "0", the routine proceeds to step 212 in which film existence detector 13 detects whether the camera has a film roll loaded therein. If NO, subsequent processing will not be run and a strobe control (step 403), or the like, will be run.

If step 211 has determined that the film count is not "0", i.e., that the camera contains a film roll and some frames thereof have already been consumed, the routine proceeds to step 213 in which a frequency of repeated falls is set to "2" and then proceeds to step 301. If step 212 has determined that the camera contains a film roll, the routine proceeds to step 214 in which the frequency of repeated falls is set to "8" and then proceeds to step 301. The frequency of repeated falls corresponds to an amount of the film roll to be advanced. More specifically, an amount of the single frame advance corresponds to the frequency "2" and, if step 211 detects the film count is "0" and step 212 ascertains that the camera has a film roll loaded therein, the frequency of repeated falls is set to "8" which corresponds to an amount of the initial film advance. More specifically, upon replacement of the source battery (step 200), the routine proceeds from step 201 to step 213 and the frequency of repeated falls is set to "2". In this manner, processing of a single frame is run.

In step 301, film transporter 11 is actuated to start film transport, whereupon a timer is set to five seconds in association with the film travel detector 12 (step 302). Then, instantaneous level "H" or "L" of a single frame switch (SoSw) is input (step 303). Step 304 determines whether the timer set to five seconds in step 302 has exceeded the preset time and, if NO, the routine proceeds to step 305 to determine whether the preset level of SoSw has changed. If NO, the routine returns to step 303 and inputs the SoSw again. Then, determination of steps 304 and 305 will be repeated. If step 305 determines that the SoSw level has changed, the routine proceeds to step 306 to determine whether such change is due to falls or not. Specifically, if "H" was input as the SoSw level on step 303, and this level has changed to "I",. it is detected that the film travel pulse has been output. The routine then proceeds to step 307 to determine whether the falls have repeated with a frequency corresponding to the frequency of repeated falls preset in step 213 or 214. If the conclusion of step 306 or 307 is NO, the routine returns to step 302 to set again the time to five seconds, and steps 303–307 will be run.

Figure 4:
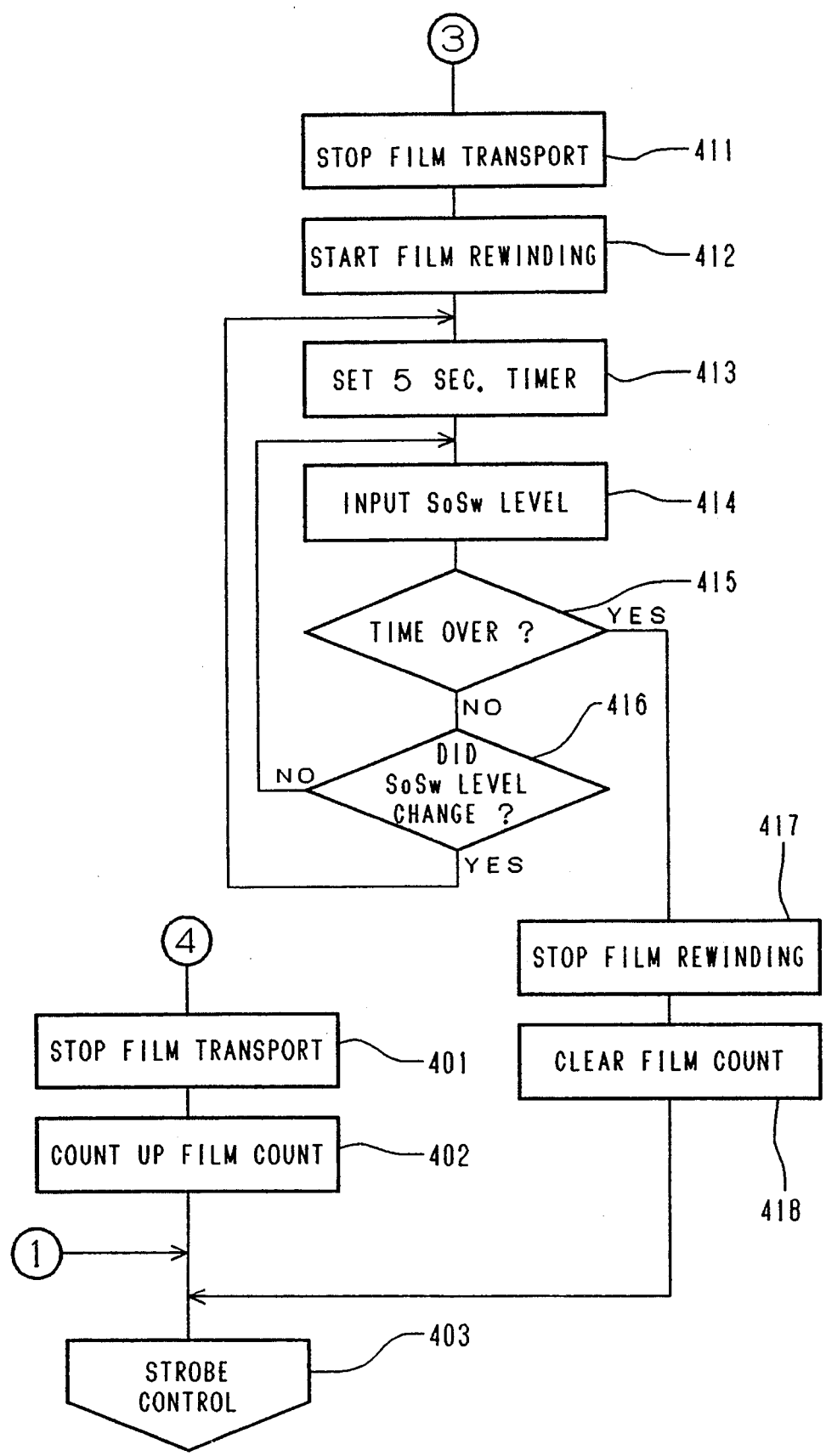
FIG. 4 also is a flow chart illustrating a routine of film transporting for the system according to FIG. 1.

If the conclusion of step 307 is YES, the routine proceeds to step 401 in the flow chart of FIG. 4 to stop further operation of film transporter 11 and thereby to stop the film transport, since this conclusion indicates that the film roll has been transported by a predetermined amount, i.e., a single frame has been advanced or the initial film advance has been completed. Accordingly, counter 14 for the number of used frames counts up the number of used frames (step 402). The routine then proceeds to step 403 to run the strobe control in preparation for the release to the next photograph.

When source battery 15 is expired with the film roll loaded in the camera, the film roll is advanced by a single frame in readiness for the next photograph upon replacement of fresh source battery 15. Consequently, the frame exposed immediately before replacement of source battery 15 is never double exposed. Upon replacement of source battery 15 (step 200), the number of used frames is reset to "0" by the initialization in step 201 and the film count is set to "1" in step 402. This count does not coincide with the actual number of used frames, but the film roll in question can be properly used in actual photographing. After this film roll is completely used for photographing, the film roll will be rewound in a manner as will be described later, and the film counter will be cleared, so that there is no more discordance between the film count and the actual number of used frames.

Step 304 determines that the preset time has been exceeded when no change occurs in the SoSw level, i.e., the film roll has been completely advanced and cannot be further advanced. In response to that state, the film roll will be rewound. The routine proceeds to step 411 to stop the film transport and step 412 reverses the electric motor 11b of film transporter 11 to start the film rewinding.

The routine proceeds to step 413 to set the timer to five seconds, in the same manner as step 303, and then proceeds to step 414 to input the SoSw level in the same manner as step 303. Step 415 determines whether the time has exceeded the preset time and, if NO, the routine proceeds to step 416 to determine whether the SoSw level has changed. If a change in the SoSw level indicating that the film roll continues to be rewound is detected, the routine returns to step 413 to set the timer to five seconds, and steps 414–416 are repeated. If the conclusion of step 416 is NO, the routine returns to step 414 and steps 415 and 416 are repeated.

If step 415 determines that the timer has exceeded the preset time, and it is indicated that the film roll has been completely rewound, step 417 stops operation of film roll rewinding, step 418 clears the film count, causing counter 14 of the number of used frames to output the count signal "0", and step 403 executes the strobe control in preparation for loading of a new film roll.

If the camera contains no film roll during replacement of the source battery, step 304 determines "time-over" and, after steps 411–418 have been run, the strobe control (step 403) is run to prepare for loading of a film roll.

Effect of the Invention

As will be readily appreciated from the foregoing description, the film transporter system for a photographic camera constructed according to the invention is advantageous over the prior art systems in that the film transporter is actuated in response to replacement of battery, switching on of the source battery to advance the film roll by a single frame, and the frame which has been set in alignment of the aperture prior to replacement of the source battery is reliably advanced to avoid double exposure of this frame.

Furthermore, replacement of the battery source causes the film roll to be advanced by only one frame and thus wasteful consumption of the film roll is avoided.

Finally, processing to be run in association with replacement of the source battery is the single frame advance. Accordingly, the invention can be controlled by a correspondingly simplified control system used to run the film transport in general.

The embodiments of the invention in which an exclusive property or privilege is claimed are defined as follows:

1. A film transporting system for a photographic camera including a source battery, the film transporting system comprising:
a film transporter energized from the source battery loaded in the camera to selectively advance or rewind a film roll loaded in the camera; and
a film travel detector adapted to detect an amount by which the film roll has been transported;
and a controller coupled to said film transporter and to said film travel detector, said controller adapted to compare an amount that the film roll has been transported by said film transporter with a preset value, corresponding to a picture frame and, if said amount of travel corresponds to said preset value, to apply a stop signal to said film transporter so that said film transporter is stopped upon reception of this signal, wherein said controller always controls said film transporter to advance the film to a next unexposed frame, by advancing the film by said present value, each time the source battery is replaced.

2. A film transporting system for a photographic camera including a source battery, and a shutter, the film transporting system comprising:
a film transporting means energized from a source battery loaded in the camera to selectively advance or rewind a film roll loaded in the camera; and
a film travel detector adapted to control film advancing and film transport by detecting a travel pulse generated every time the film roll travels by a predetermined length and applying a film stop signal to said film transporting means when the number of said travel pulses reaches a preset value corresponding to one frame of said film, wherein said film transporting means is automatically actuated to advance said film until said present value is reached each time the source battery is replaced independent of shutter release operation.

3. The film transporting system for a photographic camera according to claim 2, wherein said film travel detector detects whether the number of film travel pulses has reached said present value within a predetermined period after the film roll has started to travel.

4. The film transporting system for a photographic camera according to claim 2, wherein said film travel detector detects the film travel pulses within a preset period and this period is adjusted for every generation of the travel pulses.

5. The film transporting system for a photographic camera according to claim 3, wherein said film travel detector detects the film travel pulses within a preset period and this period is adjusted for every generation of the travel pulses.

6. A film transporting system for a photographic camera including a shutter, said film transporting system comprising:
a film transporter energized from a source battery loaded in the camera to selectively advance or rewind a film roll loaded in the camera, said film transporter preforming initial film advance in response to loading of a film roll and a single frame advance occurring after shutter release are performed by said film transporter; and
a control system wherein said control system for controlling the single frame advance is actuated automatically to advance the film to the next frame after the source battery is replaced, each time the source battery is replaced independent of shutter release operation before or after the source battery is replaced.

* * * * *

UNITED STATES PATENT AND TRADEMARK OFFICE
CERTIFICATE OF CORRECTION

PATENT NO. : 5,365,295
DATED : November 15, 1994
INVENTORS : Tatsuo Saito and Haruo Onozuka It is certified that error appears in the above-identified patent and that said Letters Patent is hereby corrected as shown below:

Column 3, line 6:
":film" should be --film--.

Column 4, line 36:
" "I",. " should be --"L,".

Column 6, line 14:
"present" should be --preset--.

Column 6, line 30:
"present" should be --preset--.

Column 6, line 36:
"present" should be --preset--.

Column 6, line 54:
"preforming" should be --performing--.

Signed and Sealed this

Seventeenth Day of October, 1995

Attest:

BRUCE LEHMAN

Attesting Officer

Commissioner of Patents and Trademarks